Patented Aug. 17, 1926.

1,596,589

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing.　　　Application filed April 6, 1925.　Serial No. 21,208.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines dispersed in a more or less permanent state throughout the oil, which constitutes the continuous phase of the emulsion. They are obtained from producing wells and from the bottom of oil storage tanks, and are commonly referred to as "cut oil", "roily oil", "emulsified oil" and "bottom settlings".

The object of my present invention is to provide a novel and inexpensive process for separating emulsions of the character referred to into their component parts of oil and water or brine.

Briefly described, my process consists in subjecting a petroleum emulsion to the action of a non-saponaceous non-saponifiable material derived from a fat or fatty material which acts on the emulsion in such a manner that the emulsion will "break" and separate into its component parts of oil and water or brine when the emulsion is permitted to remain in a quiescent state after treatment. The non-saponifiable materials that I prefer to use are various kinds of non-saponifiable, fatty derivatives such as lactones, lactides, inner-anhydrides, polyacids, polymers, condensation products, dehydration products, etc. Such materials can be obtained from oleic acid, castor oil or any fatty or soap-forming material, and are characterized by the fact that they bear a simple genetic relationship to the parent material from which they were derived. In general the method of manufacturing such materials is to subject an unsaturated fatty acid to the action of a sulphonating agent such as sulphuric acid in an amount exceeding the theoretical quantity, and permitting the acid mass to stand for a relatively long period such as thirty to sixty days. Although, such materials may be obtained from soap-forming materials, they cannot be saponified by the usual process of soap making. Hence, they differ from the fatty acids and modified fatty acids now used extensively to treat petroleum emulsions, in that they are non-saponifiable, they have no acid value, they do not react with dilute alkali and they do not react with the alkaline earths present in petroleum emulsions. They can be decomposed by the action of alcoholic potash, but the result of this decomposition is a soap of a fatty acid and not the soap of the non-saponifiable material. For example, the action of alcoholic potash on stearolactone yields the potassium soap of hydroxystearic acid and not potassium stearolactone. The action is, in reality, one of decomposition and subsequent saponification of a decomposition product and is not the saponification of the substance itself. Incidentally, the action of dilute alcoholic alkali on the non-saponifiable material results in the conversion of lactones and lactides into soluble material so that they can be separated from the non-saponifiable material which is neither lactone nor lactide. This material, thus freed from lactones and lactides, is found to have excellent treating value in breaking water-in-oil emulsions.

In practicing my process the treating agent consisting of a non-saponaceous non-saponifiable, fatty derivative is brought into contact with the emulsion either by introducing said treating agent into a well in which a petroleum emulsion is being produced, introducing said treating agent into a conduit through which a petroleum emulsion is flowing, introducing said treating agent into a tank in which a petroleum emulsion is stored, or introducing said treating agent into a container that holds a sludge obtained from the bottom of an oil storage tank.

It can even be introduced into a producing well in such a way that it will become mixed with water or oil that is emerging from the ground before said water and oil enter the barrel of the well pump or the tubing up through which said water and oil flow to the surface of the ground. After treatment the emulsion is allowed to stand in a quiescent state at a suitable temperature so as to permit the water or brine to separate from the oil, or it may be passed through a variety of apparatus, such as hay tanks, gun barrels, and so forth, such as are now commonly used in the operation of "breaking" petroleum emulsions. It may even be passed through a centrifugal or an electrical dehydrator. It is immaterial whether the non-saponaceous non-saponifiable material is used in the form of a solution or suspension, or is introduced into or mixed with the emulsion without dilution. In practicing my process commercially I prefer to use the treating agent in the form of a water insoluble combination, such as a mixture of stearolactone and liquid anhydrides produced from oleic acid. In so far as this material is substantially insoluble in water and may even be insoluble in oil, I prefer to mix it with a solubilizing agent, namely, with a substance that will give a dispersion of the non-saponifiable material in either water or oil, as the case may be but which does not act as a true solvent, and hence, does not produce ionic or molecular dispersion. The solubilizing agent could consist of ammonium oleate, calcium oleate, saponin, etc., and it need only be mixed with the non-saponifiable material. The amount of solubilizing agent used will be the minimum amount necessary to give a suitable dispersion of the non-saponifiable material. The quantity of treating agent that will be required to "break" the emulsion will depend upon the character and age of the emulsion and will vary from 1 barrel of treating agent to 2,000 barrels of emulsion to 1 barrel of treating agent to 20,000 barrels of emulsion.

Having thus described my invention, what I claim as new and desire to secure by Letters Patent is:

1. A process for recovering the oil of a petroleum emulsion, characterized by subjecting the emulsion to the action of a non-saponaceous non-saponifiable, fatty derivative which bears a simple genetic relationship to its parent material.

2. A process for effecting the recovery of the oil of a petroleum emulsion, characterized by subjecting the emulsion to the action of a treating agent composed of a non-saponaceous non-saponifiable, fatty derivative which bears a simple genetic relationship to its parent material, mixed with a solubilizing agent of the kind defined.

3. In the treatment of petroleum emulsions the step of subjecting the emulsion to the action of a treating agent composed of a lactone.

MELVIN DE GROOTE.